United States Patent
Yang et al.

(10) Patent No.: US 8,374,459 B2
(45) Date of Patent: Feb. 12, 2013

(54) DYNAMIC IMAGE COMPRESSION METHOD FOR HUMAN FACE DETECTION

(75) Inventors: Shu-Sian Yang, Hsinchu (TW); Ren-Hau Gu, Hsinchu (TW); Yi-Fang Lee, Hsinchu (TW); Ming-Tsan Kao, Hsinchu (TW); Teo-Chin Chiang, Hsinchu (TW); Chi-Cheh Liao, Hsinchu (TW); Wei-Ting Chan, Hsinchu (TW); Yu-Hao Huang, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 416 days.

(21) Appl. No.: 12/820,967

(22) Filed: Jun. 22, 2010

(65) Prior Publication Data

US 2010/0329518 A1     Dec. 30, 2010

Related U.S. Application Data

(60) Provisional application No. 61/220,559, filed on Jun. 25, 2009.

(51) Int. Cl.
    *G06K 9/40* (2006.01)

(52) U.S. Cl. .......................... 382/274; 382/118

(58) Field of Classification Search .................. 382/115, 382/118, 232, 274
See application file for complete search history.

(56) References Cited

U.S. PATENT DOCUMENTS 7,020,345 B2 * 3/2006 Tsai et al. ..................... 382/274

\* cited by examiner

*Primary Examiner* — Duy M Dang
(74) *Attorney, Agent, or Firm* — Morris Manning & Martin LLP; Tim Tingkang Xia, Esq.

(57) ABSTRACT

A dynamic image compression method for human face detection includes the following steps. An original image is acquired. The image is divided into a plurality of blocks. A first brightness and a plurality of gradient values of each block are calculated. A second brightness of each block is calculated according to a brightness transformation function and the first brightness. A reconstruction image is generated according to the second brightness and the plurality of gradient values of each block. Human face detection is performed according to the reconstruction image. Therefore, gradient values within an original square are. When the human face detection process is performed through gradient direction information, a success rate of detection is greatly increased.

10 Claims, 3 Drawing Sheets

DYNAMIC IMAGE COMPRESSION METHOD FOR HUMAN FACE DETECTION

CROSS-REFERENCE TO RELATED APPLICATIONS

This non-provisional application claims priority under 35 U.S.C. §119(e) on Patent Application No(s). 61/220,559 filed in the United States on Jun. 25, 2009, the entire contents of which are hereby incorporated by reference.

BACKGROUND OF THE INVENTION

1. Field of Invention

The present invention relates to a dynamic image compression method, and more particularly to a dynamic image compression method for human face detection.

2. Related Art

In daily life nowadays, an image capture device is already widely used. The image capture device captures an image with a light sensor, and transforms the image into digital signals, which can be stored. Supported by digital image processing technologies, a variety of applications can be designed for the digital signals captured by the image capture device.

Human images are the most important among images captured by the image capture device. For example, currently many image capture devices have human face detection and human face tracking technologies, so as to automatically assist multiple focusing of a shooting area. In addition, the human face detection technology can also be utilized to judge whether humans exist within a certain area or not. For example, the human face detection technology is applicable for judging whether a user is watching a television screen in front of the television screen. When the human face detection technology judges that nobody is currently in front of the television screen, the television screen can be automatically turned off, so as to achieve an energy saving effect.

However, when the image capture device shoots a photographed object to acquire an image, if the photographed object is in an area having complicated light, in the image, brightness of a large part of the area might be too high and brightness of another large part of the area might be too low. The image that has many pixels concentrated at a bright portion and a dark portion at the same time is referred to as a high dynamic range image (HDRI). In the HDRI, too bright and too dark spots might lose original features of the image. That is to say, when the brightness of the human face is obviously too high or obviously too low, features of the human face might be lost, so that accuracy of human face detection is decreased.

In a conventional method, a brightness transformation function is directly utilized for correction. After the HDRI is corrected by using the brightness transformation function, the too bright spots can be adjusted darker and the too dark spots can be adjusted brighter. However, direct transformation blurs original features of the human face, for example, profiles of facial features. Therefore, accuracy of human face detection is lowered.

SUMMARY OF THE INVENTION

In view of the above, the present invention is a dynamic image compression method for human face detection, so as to solve a problem that accuracy of human face detection is lowered.

The method comprises the following steps. An original image is acquired, and the image is divided into a plurality of blocks; a first brightness and a plurality of gradient values of each block are calculated; according to a brightness transformation function and the first brightness, a second brightness of each block is calculated; according to the second brightness and the plurality of gradient values of each block, a reconstruction image is generated; human face detection is performed according to the reconstruction image.

The block may be a square. The gradient values are a horizontal gradient value, a vertical gradient value, and a diagonal gradient value.

In the present invention, gradient values within the squares are calculated first, and after brightness transformation is performed on the squares, brightness values of the squares are calculated again according to the gradient values. Therefore, the gradient values within the original squares can be kept. When the human face detection process utilizes gradient direction information for detection, a success rate of detection is greatly increased. In addition, as each square is used as a unit in the present invention, calculation of the gradient values and brightness transformation are performed on pixels within the squares, and brightness is re-calculated according to the gradient values.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail through the following embodiments and the content of the detailed description is sufficient for persons skilled in the art to understand the technical content of the present invention and to implement the technical contents of the present invention there accordingly. Based upon the content of the specification, the claims, and the drawings, persons skilled in the art can easily understand the relevant objectives and advantages of the present invention.

Figure 1:
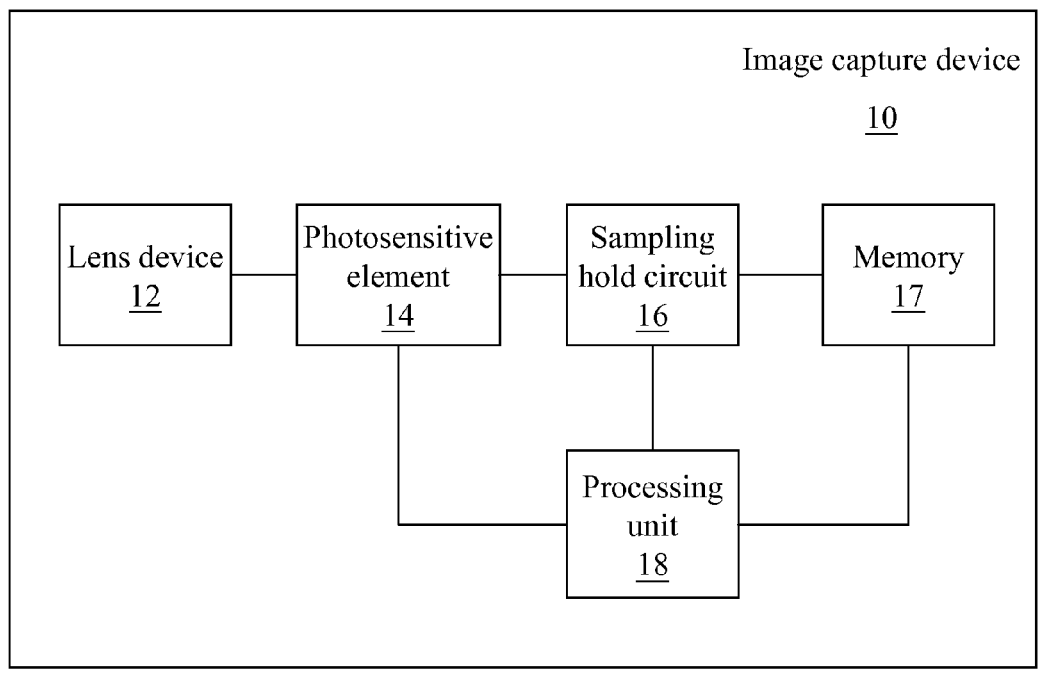
FIG. 1 is a schematic view of architecture of an image capture device in which the present invention is applicable.

FIG. 1 is a schematic view of architecture of an image capture device in which the present invention is applicable. The image capture device in which the present invention is applicable can be, but is not limited to, the architecture as shown in FIG. 1.

Referring to FIG. 1, an image capture device 10 comprises a lens device 12, a photosensitive element 14, a sampling hold circuit 16, a memory 17, and a processing unit 18. Light reflected by a scene in front of the lens device 12 enter the photosensitive element 14 through the lens device 12. The photosensitive element 14 may be a charge-coupled device (CCD) or a complementary metal-oxide-semiconductor (CMOS). The photosensitive element 14 transforms the incident light rays into electronic signals and transfers the electronic signals to the sampling hold circuit 16, and an image file is recorded in the memory 17. The processing unit 18 can be a microprocessor, a micro-controller, an application-specific integrated circuit (ASIC) or a field programmable gate array (FPGA). The processing unit 18 is used for controlling the photosensitive element 14, the sampling hold circuit 16, and the memory 17, and is further used for implementing the dynamic image compression method for an image according to the present invention.

Figure 2:
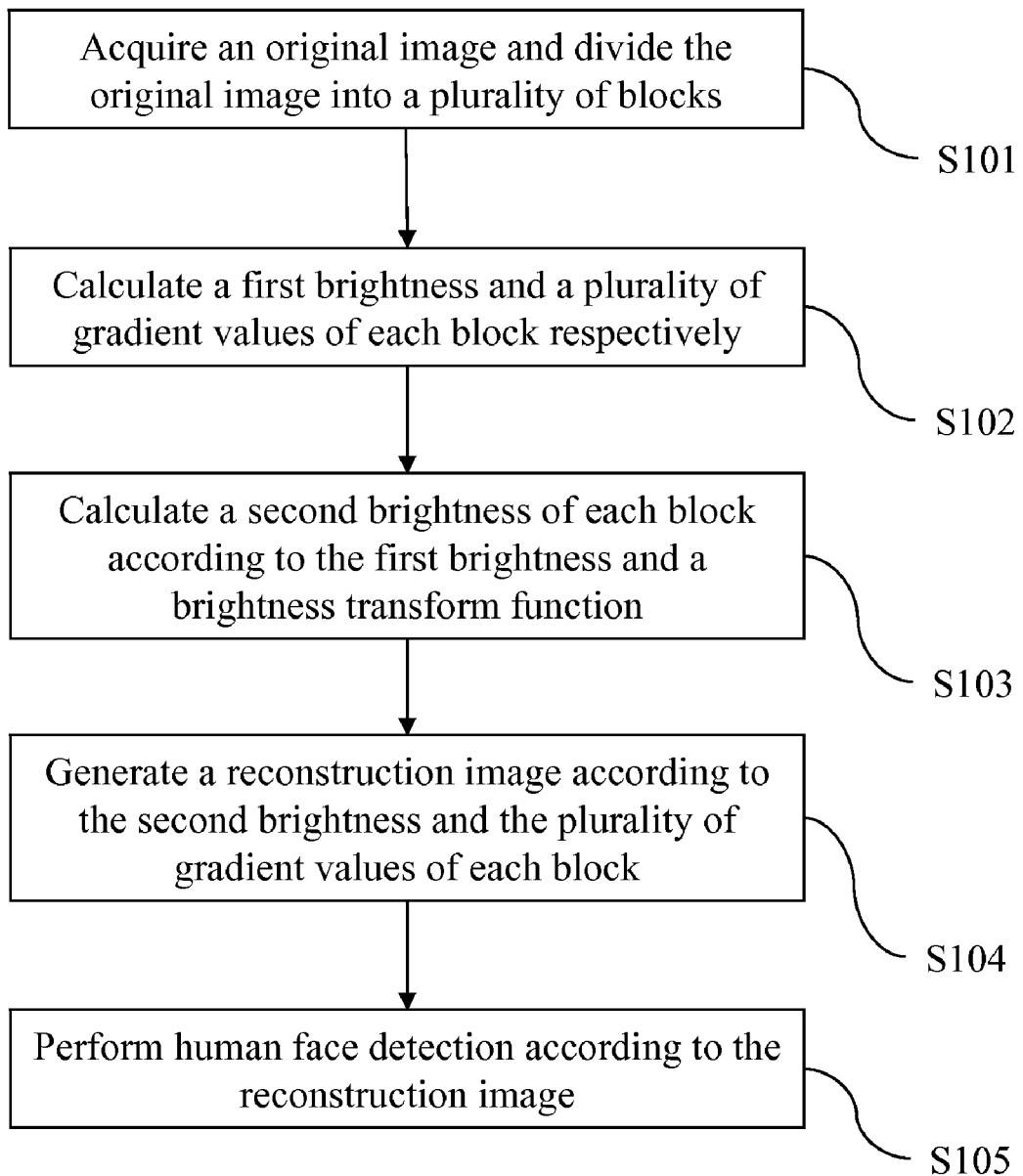
FIG. 2 is a flow chart of an embodiment of the present invention.

FIG. 2 is a flow chart of an embodiment of the present invention.

In Step S101, an image is acquired with the image capture device 10. The image capture device 10 can acquire an image periodically or non-periodically. Subsequently, the acquired image is divided into a plurality of blocks. The blocks are preferably squares. For example, an image with a resolution of 240×180 pixels can be divided into 120×90 squares and a size of each square is 2×2 pixels. The image can also be divided into 80×60 squares and a size of each square is 3×3 pixels.

In Step S102, a first brightness and gradient values of each block are calculated. The first brightness is defined as an average value of brightness of all pixels in the block. The brightness of a pixel is defined as a Y value in a luminance and chrominance intensity (YUV) color value of the pixel. Each block produces a brightness value. Gradient values of the block are a horizontal gradient value, a vertical gradient value, and a diagonal gradient value.

Taking a square having the size 2×2 as an example, it is assumed that the brightness of the 2×2 square pixels is defined as $$\begin{bmatrix} a_1 & a_2 \\ a_3 & a_4 \end{bmatrix},$$

the first brightness is $$\frac{a_1 + a_2 + a_3 + a_4}{4},$$

the horizontal gradient value is defined as $a_1+a_3-(a_2+a_4)$, the vertical gradient value is defined as $a_1+a_2-(a_3+a_4)$, and the diagonal gradient value is defined as $a_1+a_4-(a_2+a_3)$.

As can be seen from the example of the 2×2 square, the number of the pixels is equal to the total number of the first brightness, the horizontal gradient value, the vertical gradient value, and the diagonal gradient value. In other words, linear transformation such as wavelet transformation can be performed on the values inside the square, so as to obtain the first brightness and the gradient values.

Figure 3:
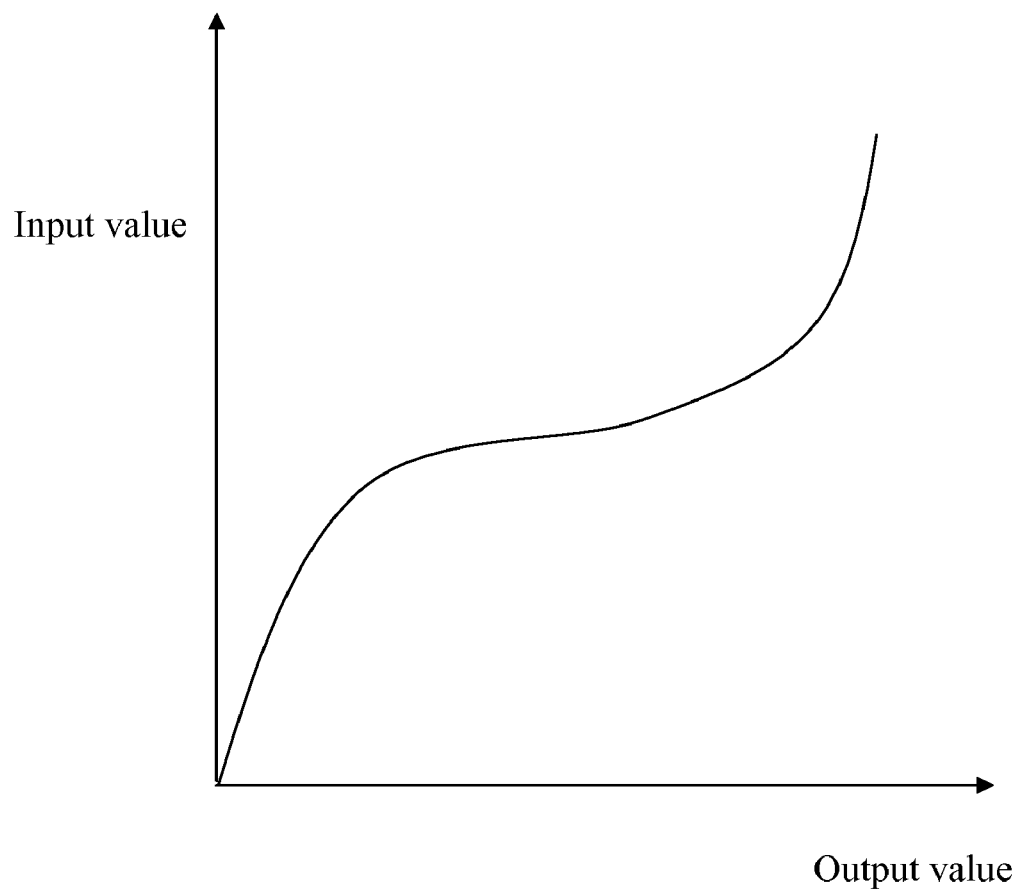
FIG. 3 is a schematic view of a brightness transformation function according to the present invention.

In Step S103, a second brightness can be acquired from the first brightness through a brightness transformation function. FIG. 3 is a schematic view of a brightness transformation function. In FIG. 3, the horizontal axis represents an input value of the brightness transformation function, and the vertical axis represents an output value of the brightness transformation function. The first brightness is the input value and the second brightness is the output value. The brightness transformation function may be a look-up table. When transformation is needed, the first brightness is transformed to the second brightness through the look-up table. The brightness transformation function may be a Gamma curve.

In Step S104, values within the square are calculated according to the second brightness, the horizontal gradient value, the vertical gradient value, and the diagonal gradient value and through inverse transformation of the linear transform.

Taking a 2×2 square as an example, the second brightness of the square is $c_2$ and $$c_2 = \frac{a_1 + a_2 + a_3 + a_4}{4},$$

the horizontal gradient value is $g_1=a_1+a_3-(a_2+a_4)$, the vertical gradient value is defined as $g_2=a_1+a_2-(a_3+a_4)$, and the diagonal gradient value is defined as $g_3=a_1+a_4-(a_2+a_3)$. From the four formulas, four unknown numbers $a_1$, $a_2$, $a_3$, $a_4$ can be calculated. In this example, $$a_1 = c_2 + \frac{g_1 + g_2 + g_3}{4},$$

$$a_2 = c_2 + \frac{-g_1 + g_2 - g_3}{4},$$

$$a_3 = c_2 + \frac{g_1 - g_2 - g_3}{4},$$

and $$a_4 = c_2 + \frac{-g_1 - g_2 + g_3}{4}.$$

Similarly, in a 3×3 square, each value within the square can also be calculated accordingly.

Steps S102 to S104 can be performed for each square repetitively and continuously. In other words, a square in the image can be processed through Steps S102 to S104 and output to obtain a reconstructed block image, and the image is then output. After all the squares are processed and output, the squares are recombined according to a position of each square in the original image, so as to obtain a recombined image.

Finally, in Step S105, according to the recombined image, a human face detection process is performed. The human face detection process is to detect whether a human face area exists in the image according to a plurality of human face features. The human face features are usually featured areas on a human face, such as eyes, eyebrows, a nose or a mouth. When the detection process is performed, gradient direction information among the features can be found through the features, and the gradient direction information is used as a reference for detection. In addition, features such as a profile and a shape of a human face can also be used as a reference for detection. The human face features can be hundreds or thousands in number. After the image is filtered according to the hundreds or thousands of features, an area that conforms to the features is a human face area.

Through the operation from Steps S101 to S105, gradient values within the squares can be calculated first, and after brightness transformation of the squares, brightness values of the squares can be calculated again according to the gradient values, so as to keep the features in the original image.

In order to make persons skilled in the art to further understand the efficacy of the present invention, actual values are used in the following for illustration.

It is assumed that a 2×2 square is $$\begin{bmatrix} 40 & 44 \\ 46 & 50 \end{bmatrix},$$

a first brightness is $c_1=45$, a horizontal gradient value is $g_1=40+46-(44+50)=-8$, a vertical gradient value is defined as $g_2=40+44-(46+50)=-12$, and a diagonal gradient value is defined as $g_3=40+50-(44+46)=0$.

During the transformation through the brightness transformation function, it is assumed that in the following segments, a relation between the input value and the output value in the brightness function is as follows. If the input value is 40-42, the output value is 50. If the input value is 43-45, the output value is 51. If the input value is 46-47, the output value is 52. If the input value is 48-49, the output value is 53. If the input value is 50-51, the output value is 54.

In a conventional method, the square is directly transformed through the brightness transformation function, so that an obtained output result is $$\begin{bmatrix} 50 & 51 \\ 52 & 54 \end{bmatrix}.$$

Before the transform, a difference between the upper left and lower right values in the block is 10. After the transform, the difference is only 4. As in the human face detection, the difference value is usually used as a threshold for judgment, after the brightness transformation of the values, the values higher than a detection threshold originally are lower than the detection threshold after transform. That is to say, in the conventional method, after the brightness transform, the success possibility of the human face detection might be decreased.

In the present invention, the second brightness $c_2=51$ is obtained after brightness transformation of the first brightness $c_1=45$. Subsequently, according to the horizontal gradient value $g_1=-8$, the vertical gradient value $g_2=-12$, and the diagonal gradient value $g_3=0$, each value in the original block is calculated. According to the calculation method, it is obtained that the upper left, the upper right, the lower left, and the lower right values in the 2×2 block are $$a_1 = 51 + \frac{-8 + (-12) + 0}{4} = 46,$$

$$a_2 = 51 + \frac{-(-8) + (-12) - 0}{4} = 50,$$

$$a_3 = 51 + \frac{(-8) - (-12) - 0}{4} = 52,$$

and $$a_4 = 51 + \frac{-(-8) - (-12) + 0}{4} = 56,$$

, respectively. That is to say, the 2×2 block is $$\begin{bmatrix} 46 & 50 \\ 52 & 56 \end{bmatrix}.$$

In the 2×2 block calculated through the present invention, a difference between the upper left and lower right values is still 10, that is, the difference remains the same before and after the transform. Therefore, through the dynamic image compression method according to the present invention, the image can be adjusted to a proper brightness and the difference values between pixels are still kept the same, so as to increase the success rate of the human face detection.

In addition to the calculation mode, the following variations can further be made to the present invention. In order to further increase the success rate of the human face detection, the horizontal gradient value, the vertical gradient value, and the diagonal gradient value can be adjusted.

In an embodiment of the present invention, the horizontal gradient value, the vertical gradient value, and the diagonal gradient value can be multiplied by a constant. Subsequently, the pixel values in the block are then calculated according to the adjusted gradient values.

The above example is used for illustration. The horizontal gradient value, the vertical gradient value, and the diagonal gradient value are multiplied by 2 first to obtain the adjusted horizontal gradient value $g_1=-8\times2=-16$, vertical gradient value $g_2=-12\times2=-24$, and diagonal gradient value $g_3=0$. According to the calculation method, it can be obtained that the upper left, upper right, lower left, and lower right values in the 2×2 block are $$a_1 = 51 + \frac{-16 + (-24) + 0}{4} = 41,$$

$$a_2 = 51 + \frac{-(-16) + (-24) - 0}{4} = 49,$$

$$a_3 = 51 + \frac{(-16) - (-24) - 0}{4} = 53,$$

and $$a_4 = 51 + \frac{-(-8) - (-12) + 0}{4} = 61,$$

respectively. That is to say, the 2×2 block is $$\begin{bmatrix} 41 & 49 \\ 53 & 61 \end{bmatrix}.$$

As can be seen from the calculated result, the difference between the upper left and lower right values in the block is increased to 20 from the original 10. The method can enhance features at edges, so as to increase the success rate of recognition.

In addition, the gradient values can also be adjusted dynamically depending on a difference between the first brightness and the second brightness. For example, when the difference between the first brightness and the second brightness is large, the gradient values are properly increased. When the difference between the first brightness and the second brightness is small, the gradient values remain unchanged.

In conclusion, in the present invention, gradient values within the squares can be calculated first, brightness transformation is performed on the squares, and brightness values of the squares are re-calculated according to the gradient values. Therefore, the gradient values within the original squares can be kept. When the human face detection process utilizes the gradient direction information for detection, the success rate of the detection is greatly increased. In addition, as the square is used as a unit in the present invention, the calculation of the gradient values and the brightness transformation are performed on the pixels within the square and brightness is re-calculated according to the gradient values. Therefore, only quite a small amount of data needs to be temporarily stored for processing and operation. That is to say, if the method of the present invention is implemented through hardware, only a memory 17 having a very small capacity is needed. In addition, operation complexity of the present invention is very low, so that the present invention is very suitable for real-time operation in the image capture device 10.

What is claimed is:

1. A dynamic image compression method for human face detection, comprising:
   acquiring an original image, and dividing the original image into a plurality of blocks;
   calculating a first brightness and a plurality of gradient values of each of the blocks;
   calculating a second brightness of each of the blocks according to a brightness transformation function and the first brightness;
   generating a reconstruction image according to the second brightness and the plurality of gradient values of each of the blocks; and
   performing the human face detection according to the reconstruction image.

2. The dynamic image compression method for the human face detection according to claim 1, wherein each of the blocks is a square.

3. The dynamic image compression method for the human face detection according to claim 2, wherein the plurality of gradient values comprise a horizontal gradient value, a vertical gradient value, and a diagonal gradient value.

4. The dynamic image compression method for the human face detection according to claim 1, wherein the calculating the first brightness and the plurality of gradient values of each of the blocks comprises performing linear transformation on a plurality of values of the block, so as to obtain the first brightness and the plurality of gradient values.

5. The dynamic image compression method for the human face detection according to claim 4, wherein the generating the reconstruction image according to the second brightness and the plurality of gradient values of each of the blocks comprises reconstructing a block image according to the second brightness and the plurality of gradient values of the block for each of the blocks, and combining the plurality of block images after the plurality of block images is reconstructed, so as to obtain the reconstruction image.

6. The dynamic image compression method for the human face detection according to claim 5, wherein the reconstructing the block image according to the second brightness and the plurality of gradient values of the block comprise performing inverse transformation of the linear transform on the second brightness and the plurality of gradient values, so as to obtain the plurality of values of the block.

7. The dynamic image compression method for the human face detection according to claim 4, wherein the generating the reconstruction image according to the second brightness and the plurality of gradient values of each of the blocks comprises adjusting the gradient values by multiplying the gradient values by a parameter for each of the blocks, reconstructing a block image according to the second brightness and the adjusted gradient values, and combining the plurality of block images after the plurality of block images is reconstructed, so as to obtain the reconstruction image.

8. The dynamic image compression method for the human face detection according to claim 7, wherein the reconstructing the block image according to the second brightness and the adjusted gradient values comprises performing inverse transformation of the linear transformation on the second brightness and the adjusted gradient values, so as to obtain the plurality of values of the block.

9. The dynamic image compression method for the human face detection according to claim 4, wherein the generating the reconstruction image according to the second brightness and the plurality of gradient values of each of the blocks comprises adjusting the gradient values according to a difference between the first brightness and the second brightness for each of the blocks, reconstructing a block image according to the second brightness and the adjusted gradient values, and combining the plurality of block images after the plurality of block images is reconstructed, so as to obtain the reconstruction image.

10. The dynamic image compression method for the human face detection according to claim 9, wherein the reconstructing the block image according to the second brightness and the adjusted gradient values comprises performing inverse transformation of the linear transformation on the second brightness and the gradient values, so as to obtain the plurality of values of the block.

* * * * *